(12) United States Patent
Ohno

(10) Patent No.: US 7,146,824 B2
(45) Date of Patent: Dec. 12, 2006

(54) VALVE PLUG AND VALVE PROVIDED THEREWITH

(75) Inventor: Katsuji Ohno, Gifu-ken (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 315 days.

(21) Appl. No.: 10/787,918

(22) Filed: Feb. 26, 2004

(65) Prior Publication Data

US 2004/0261437 A1 Dec. 30, 2004

(30) Foreign Application Priority Data

Jun. 26, 2003 (JP) ............... 2003-182521

(51) Int. Cl.
*F25B 45/00* (2006.01)
*H01S 1/00* (2006.01)

(52) U.S. Cl. ............... 62/292; 62/222; 251/88

(58) Field of Classification Search .......... 62/292, 62/222, 77; 251/84, 85, 88, 357, 360; 137/234.5, 137/454.2, 454.4

See application file for complete search history.

(56) References Cited

U.S. PATENT DOCUMENTS 1,974,639 A 9/1934 Bates 3,155,367 A 11/1964 Gifford
6,266,971 B1 7/2001 Schroder et al.

FOREIGN PATENT DOCUMENTS

CN 2483565 3/2002
FR 550 806 A 3/1923

OTHER PUBLICATIONS

Chinese Office Action issued Jul. 7, 2005, 5 pages (English translation attached - 3pages).

Primary Examiner—Chen Wen Jiang
(74) Attorney, Agent, or Firm—Akin Gump Strauss Hauer & Feld, LLP

(57) ABSTRACT

A valve plug is threadedly engaged with a valve stem so as to be inserted from an open end of a passage for charging with and/or releasing from a compressed fluid, toward an inner part of the passage, thereby closing an inner smaller diameter portion. The valve plug includes a threadedly engaging member threadedly engaging a portion of the passage located nearer to the open end side than the smaller diameter portion, and a turn head turnably connected to an end of the threadedly engaging member and having a distal end inserted into the smaller diameter portion so as to adhere closely to an open edge of the smaller diameter portion.

17 Claims, 9 Drawing Sheets

VALVE PLUG AND VALVE PROVIDED THEREWITH

BACKGROUND OF THE INVENTION

1. Field of the Invention

This invention relates to a valve plug threadedly engaged with a member such as a valve stem so as to be inserted from an open end of the member into a passage defined inside the member for charging with and/or releasing from a compressed fluid, thereby to close an inner smaller diameter portion of the passage. The invention further relates to a valve provided with the valve plug.

2. Description of the Related Art

U.S. Pat. No. 6,266,971 to Schroder et al. discloses one of conventional valves of the above-described type. The disclosed valve comprises a valve plug including a threadedly engaging member with a tapered portion formed integrally with a distal end thereof. The valve plug is threadedly engaged with a cylindrical stem so as to be inserted into a passage defined in the stem, so that the tapered portion of the valve plug is inserted into a smaller diameter portion of the passage defined in an inner part of the passage, thereby closing the passage. The valve plug has a tool cavity formed in an end face opposite the tapered portion and a communication hole extending from an inner face of the tool cavity to a side face of the plug near the tapered portion. When the tapered portion is departed from the smaller diameter portion, a compressed fluid is allowed to pass via the communication hole through the valve plug.

In the above-noted valve plug, until the valve plug is further threadedly engaged with the stem after abutment of the tapered portion against the smaller diameter portion so that the tapered portion adheres closely to the smaller diameter portion, the tapered portion is slidingly turned while being pressed against the smaller diameter portion. As a result, sliding portions of the tapered portion and the valve plug are worn out, whereupon the valve plug has a low reliability in its repeated use. Furthermore, the communication hole is closed while a tool is in engagement with the tool cavity. Consequently, releasing from the compressed fluid via the smaller diameter portion cannot be carried out while the valve plug is threadedly engaged with the tool.

SUMMARY OF THE INVENTION

Therefore, an object of the present invention is to provide a valve plug which can improve the reliability in its repeated use and a valve provided with the valve plug.

The present invention provides a valve plug threadedly engaged thereby to be inserted from an open end of a passage for charging with and/or releasing from a compressed fluid toward an inner part of the passage, thereby closing a smaller diameter portion. The valve plug includes a threadedly engaging member threadedly engaging a portion of the passage located nearer to the open end side than the smaller diameter portion, and a turn head turnably connected to an end of the threadedly engaging member and having a distal end inserted into the smaller diameter portion so as to adhere closely to an open edge of the smaller diameter portion.

As the threadedly engaging member is threadedly engaged so as to be inserted into the passage, the distal end of the turn head reaches the smaller diameter portion, abutting an open edge of the smaller diameter portion. When the threadedly engaging member is further screwed, the turn head adheres closely to the open edge of the smaller diameter portion, thereby closing the smaller diameter portion. Since the turn head is turnable relative to the threadedly engaging member, the turn head runs idle relative to the threadedly engaging member until further pressed to adhere closely to the open edge of the smaller diameter portion after abutment against the open edge. Consequently, the turn head and the smaller diameter portion can be prevented from wear due to sliding turn therebetween. Thus, the valve plug can be improved in the reliability in its repeated use or operation.

In a preferred form of the invention, the valve plug further comprises a support shaft protruding from either one of the threadedly engaging member and the turn head toward the other, the support shaft having a distal end formed with a flange and a cylindrical portion formed so as to protrude from said other of the threadedly engaging member and the turn head toward said one of the threadedly engaging member and the turn head, wherein the flange is accommodated in the cylindrical portion and the cylindrical portion has a distal end inwardly bent so that the turn head is turnably connected to said one end of the threadedly engaging member.

The turn head can turnably be connected to the end of the threadedly engaging member when the flange is fitted in the cylindrical portion and the distal end of the cylindrical portion is bent inward.

In another preferred form of the invention, the threadedly engaging member has an end face located opposite the turn head and formed with a tool cavity used for threaded engagement of the threadedly engaging member, and the threadedly engaging member has an outer peripheral face includes a communication passage defining portion defining a communication passage in association with an inner circumferential face of the passage, the compressed fluid flowing through the communication passage.

A tool is engaged with the tool cavity of the threadedly engaging member and then manipulated so that the turn head is separated from the smaller diameter portion. A compressed fluid discharged from the smaller diameter portion passes through the valve plug via the communication passage defined between the communication passage defining portion and the inner circumferential face of the passage. Thus, charging with and releasing from the compressed fluid can be carried out while the valve plug is being operated. Furthermore, when the tool engaged with the tool cavity and manipulated so that the turn head is separated from the smaller diameter portion, the compressed fluid passes through the valve plug via the communication passage open at a position other than the tool cavity. Consequently, charging with and releasing from the compressed fluid can be realized while the valve plug is being manipulated with the tool.

BRIEF DESCRIPTION OF THE DRAWINGS

Other objects, advantages and features of the present invention will become clear upon reviewing the following description of embodiments, made with reference to the accompanying drawings, in which.

DETAILED DESCRIPTION OF THE INVENTION

Figure 1:
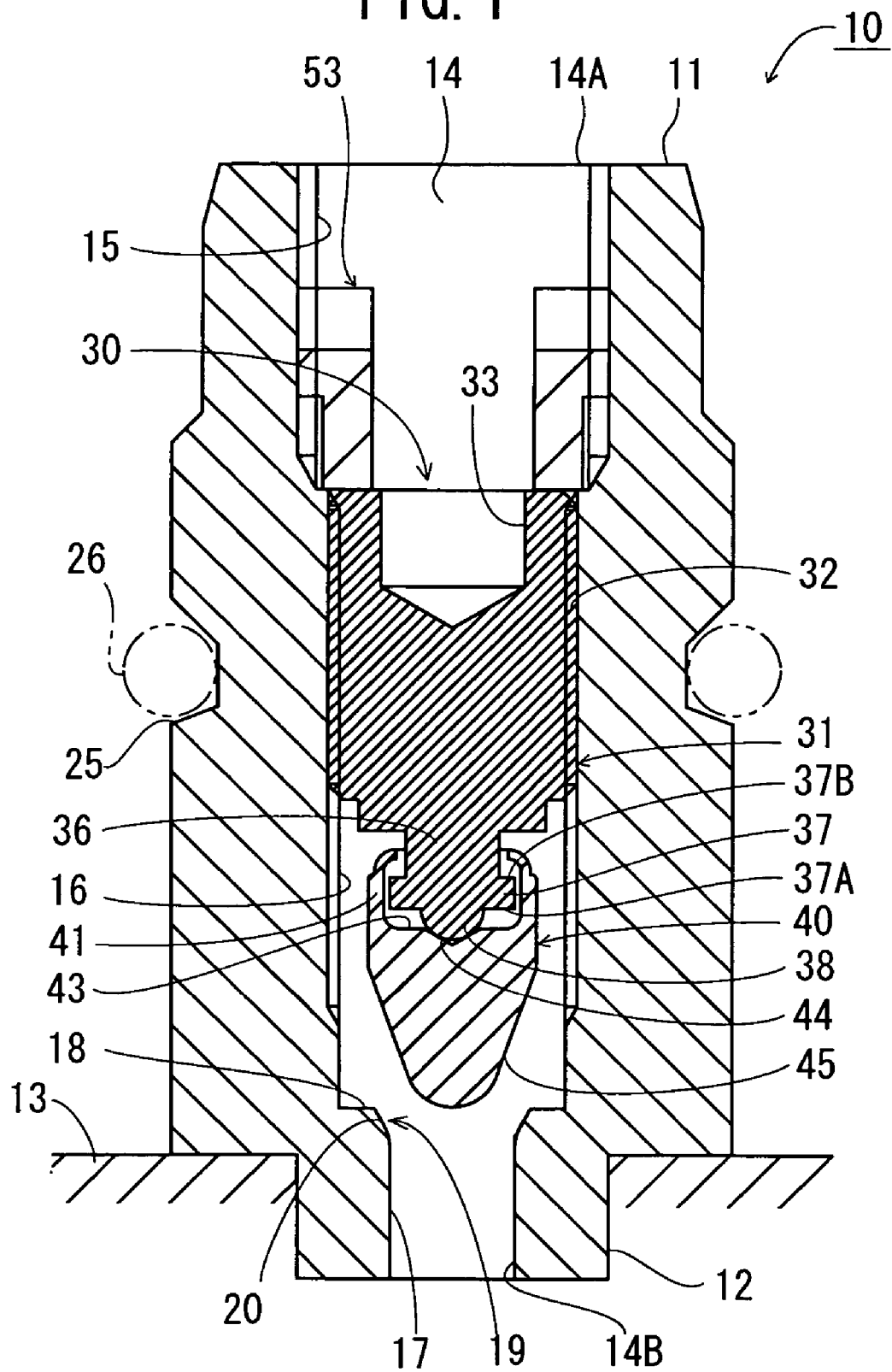
FIG. 1 is a side sectional view of a valve in accordance with one embodiment of the present invention, showing an open state of the valve.
Figure 2:
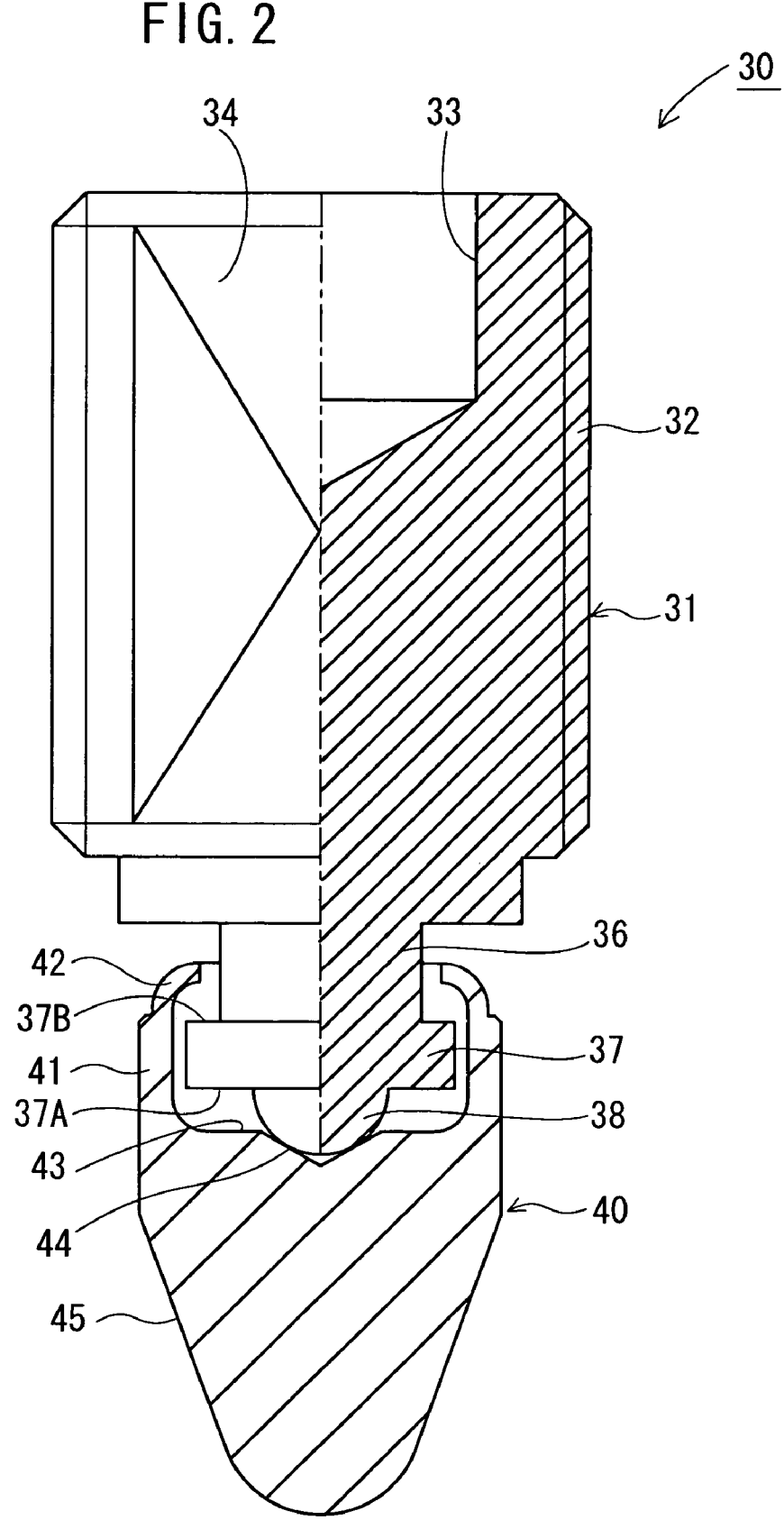
FIG. 2 is a partial sectional view of a valve plug.

An embodiment of the present invention will be described with reference to FIGS. 1 to 6. A valve 10 of the embodiment comprises a stem 11 and a valve plug 30 threadedly engaged with an inner wall of the stem thereby to be assembled to the stem. The stem 11 is an aluminum cylinder, for example, and extends vertically as viewed in FIG. 1. The stem 11 has a connecting portion 12 protruding from a lower end thereof. The connecting portion 12 is connected to a refrigerant tube 13 of a car air conditioner, for example, so that a passage 14 defined inside the stem 11 communicates with a refrigerant passage (not shown) of the car air conditioner.

Figure 3:
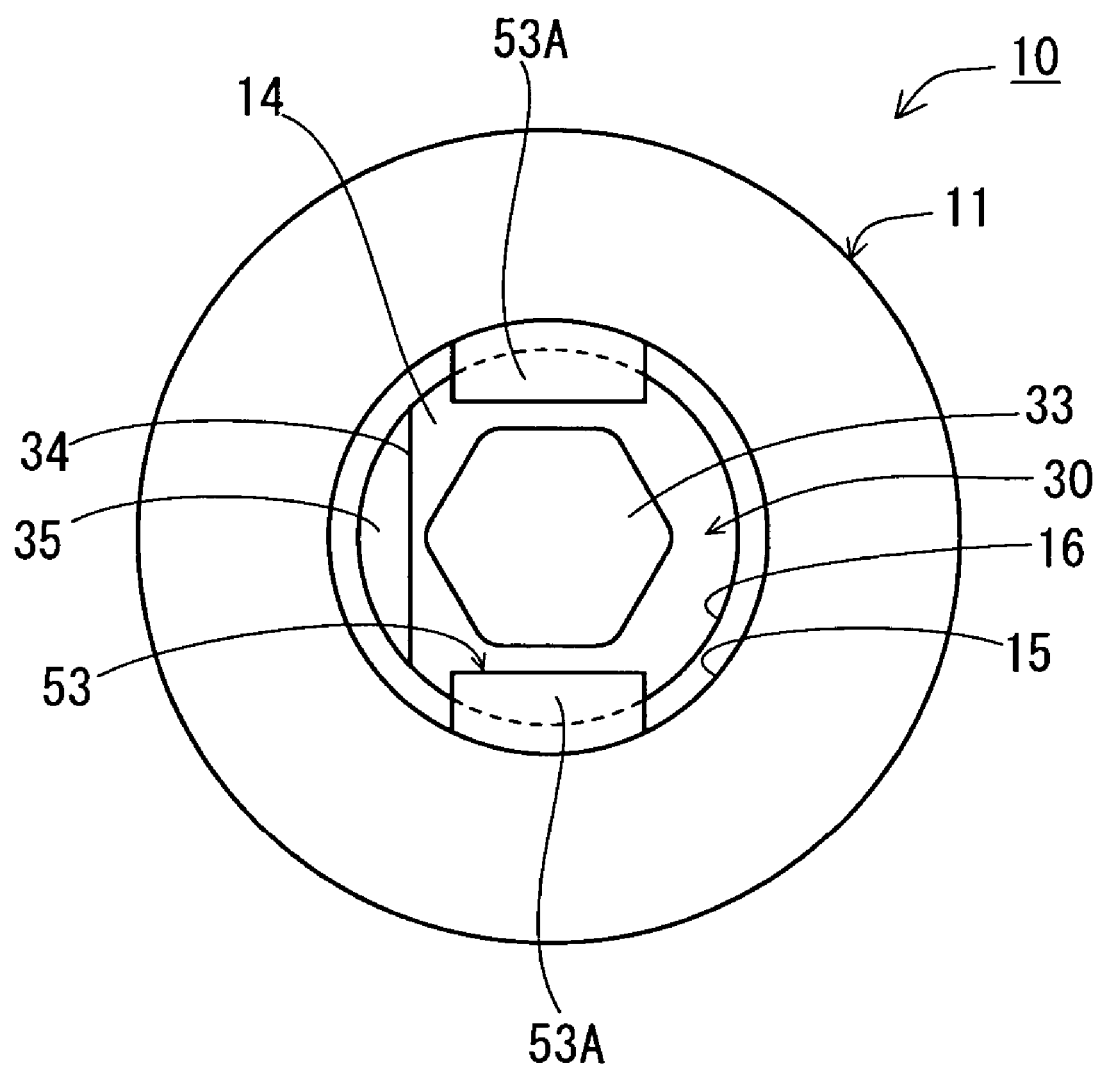
FIG. 3 is a plan view of the valve plug.

The stem 11 has a generally circular cross section as shown in FIG. 3. The stem 11 has an O-ring groove 25 formed in an axially middle portion of its outer circumferential wall thereof as shown in FIG. 1. An O-ring 26 is fitted in the groove 25. The passage 14 of the stem 11 has an open end 14A and includes a largest diameter thread portion 15, an intermediate diameter thread portion 16 and a smallest diameter portion 17 (a smaller diameter portion). These portions 15 to 17 are aligned sequentially from the open end 14A toward the refrigerant tube 13. A stopper ring 53 is threadedly engaged with the largest diameter portion 15 after the valve plug 30 has been threadedly engaged with the intermediate diameter thread portion 16. The stopper ring 53 has two centrally protruding engagement claws 53A formed to be opposed to each other as shown in FIG. 3. The engagement claws 53A prevent the valve plug 30 from falling off. The stopper ring 53 has such an inner diameter that a tool 54 (see FIG. 6) used for threaded engagement of the valve plug 30 can be inserted therethrough.

A stepped face 18 is formed between the intermediate diameter thread portion 16 and the smallest diameter portion 17 as shown in FIG. 1. The stepped face 18 has an open edge 19 formed with a tapered face 20 whose diameter is gradually reduced toward an inner part of the smallest portion 17.

The valve plug 30 includes a shaft-like threadedly engaging member 31 having an end to which a turn head 40 is turnably connected. The threadedly engaging member 31 has an outer circumferential face formed with a male thread 32 which threadedly engages the intermediate diameter thread portion 16 of the passage 14. The threadedly engaging member 31 has the other end (an upper end in FIG. 2) formed with a hexagonal tool cavity 33 (see FIG. 3), for example. A tool 54 is inserted into the tool cavity 33 so that the threadedly engaging member 31 is turned, whereupon the valve plug 30 can be moved in the passage 14. The outer circumferential face of the threadedly engaging member 31 includes a flat communication passage defining portion 34 axially intersecting the male thread 32. A communication passage 35 is defined between the communication passage defining portion 34 and the inner circumferential face of the passage 14 as shown in FIG. 3. A compressed fluid passes through the communication passage 35. The threadedly engaging member 31 includes a support shaft 36 protruding from the central end opposite the tool cavity 33. The support shaft 36 has a distal end from which a flange 37 extends sidewise. The flange 37 has a semispherical abutment boss 38 protruding from a central portion of an end face 37A thereof.

Figure 4:
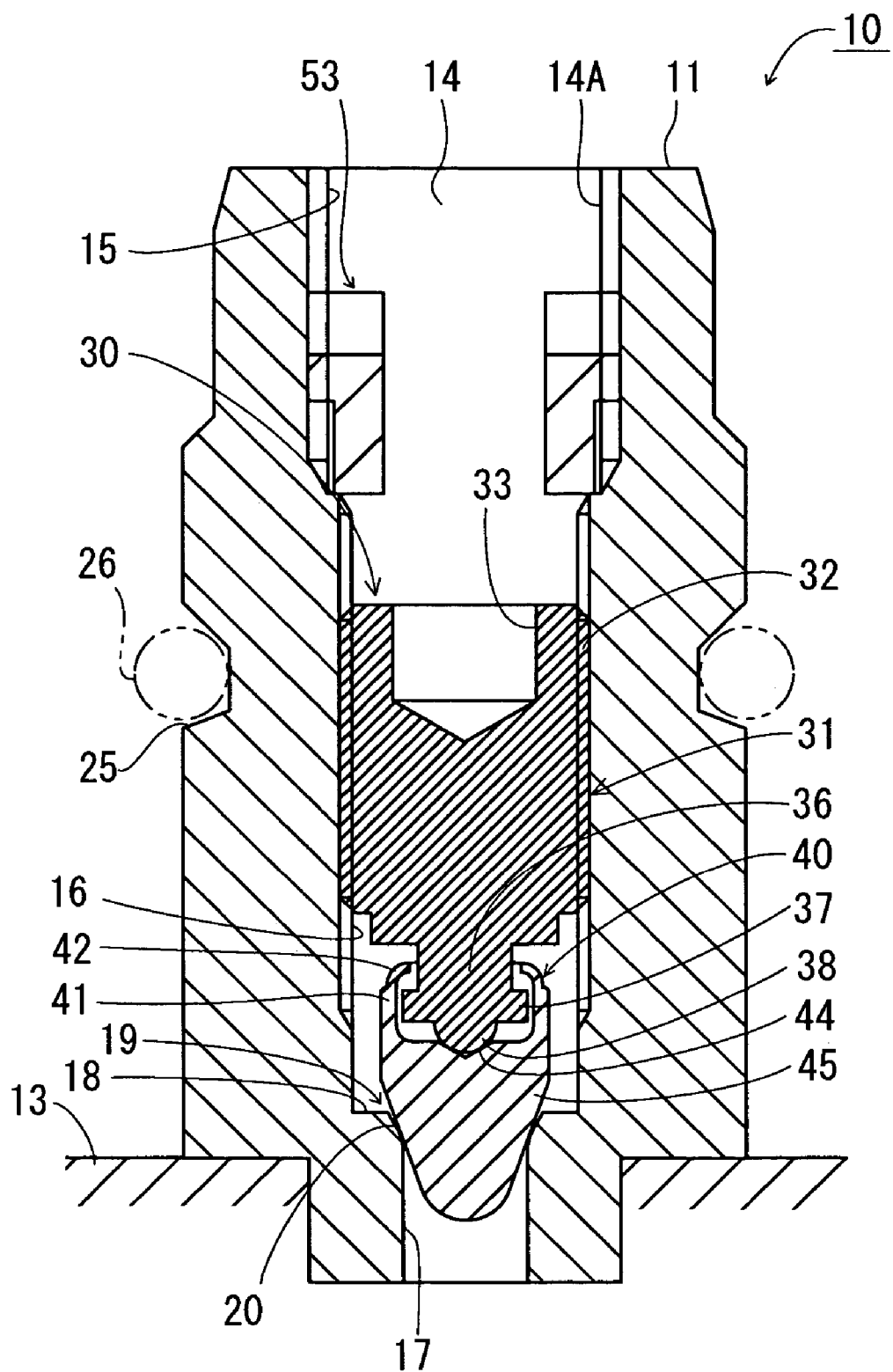
FIG. 4 is a side sectional view of the valve in a closed state.

The turn head 40 is made of stainless steel, for example. The turn head 40 has a distal end 45 tapered toward the smallest diameter portion 17. The tapered distal end 45 has an inclination angle more acute than the tapered face 20 of the open edge 19 of the smallest diameter portion 17 as shown in FIG. 4. As a result, an inner corner portion of the tapered face 20 abuts a middle portion of the tapered face of the distal end 45 to be squeezed. Consequently, metal to metal sealing is provided between the open edge 19 of the tapered face 20 and the turn head 40.

The turn head 40 has a cylindrical portion 41 protruding from a proximal end thereof toward the threadedly engaging member 31. The cylindrical portion 41 has a distal end provided with a thinner portion 42 which is bent inward while the flange 37 is loosely fitted in the cylindrical portion. The thinner portion 42 engages a backside 37B of the flange 37, whereby the turn head 40 is turnably connected to the threadedly engaging member 31. The turn head 40 has a boss receiving portion 44 formed in a center of an inner face 43 of the cylindrical portion 41. The boss receiving portion 44 is formed generally into a conical shape and its diameter is gradually reduced toward the bottom. The abutment boss 38 of the threadedly engaging member 31 is received by the boss receiving portion 44. The turn head 40 is inclined relative to the threadedly engaging member 31 with its portion in abutment with the boss 38 serving as a fulcrum.

Figure 6:
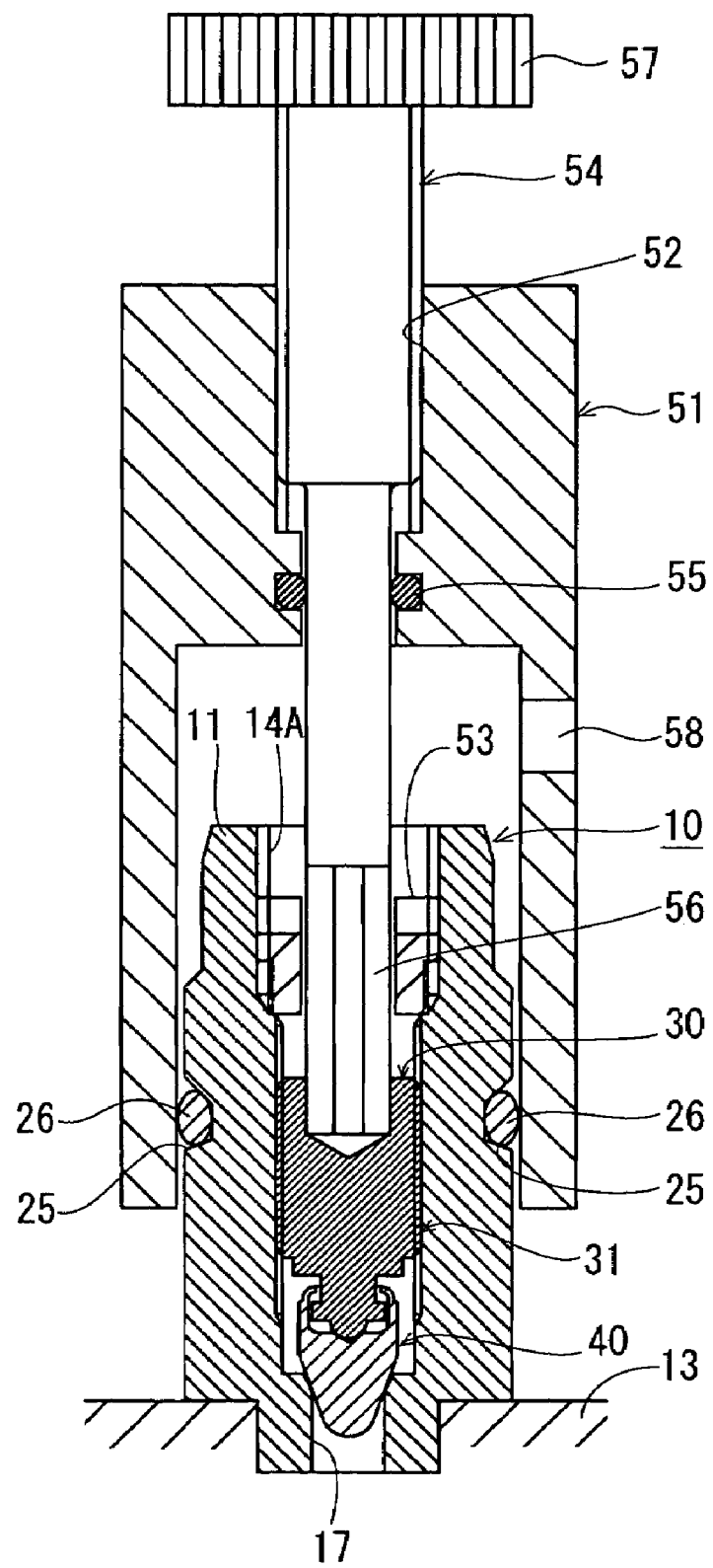
FIG. 6 is a side sectional view of the valve with a tool being attached thereto.

A tool attachment cylinder 51 is detachably fitted with an outer periphery of the valve 10 as shown in FIG. 6. The tool attachment cylinder 51 is formed into a cylindrical shape and has a bottom. The bottom of the cylinder 51 is formed with a centrally located through tool attachment hole 52. A tool 54 extends through the tool attachment hole 52. The tool 54 includes a manipulation knob 57 provided at one end thereof projecting outside the tool attachment cylinder 51 and an engaging portion 56 which is provided at the other end thereof projecting through the inner face of the tool attachment cylinder 51 and has a hexagonal section. An O-ring 55 is provided in an axially middle portion of the tool attachment hole 52 so as to be adherent closely to the tool 54. The tool attachment hole 51 includes a circumferential wall having a supply and exhaust passage 58 provided for fluid communication between an interior and exterior of the tool attaching cylinder 51.

The valve plug 30 and the valve 10 will operate as follows. In order that the valve 10 may be closed, the valve 30 is threadedly engaged with the stem 11 so as to be inserted into the passage 14 toward the smallest diameter portion 17. More specifically, the tool 54 is inserted through the opening 14A of the stem 11 so that the distal engaging portion 56 of the tool is fitted in the tool cavity 33 as shown in FIG. 6. In case that no fluid may be caused to flow through the passage 14, the tool 54 is allowed to be used without the tool attaching cylinder 51.

The threadedly engaging member 31 is manipulated by the tool 54 so as to be inserted into an inner portion of the passage 14. The distal end 45 of the turn head 40 mounted to the distal end of the threadedly engaging member 31 enters the smallest diameter portion 17, abutting the open edge 19 of the smallest diameter portion 17 as shown in FIG. 4. When the threadedly engaging member 31 is further screwed, the turn head 40 adheres closely to the open edge 19 of the smallest diameter portion 17, whereupon the end corner of the tapered face 20 of the open edge 19 is squeezed by the turn head 40. As a result, a metal to metal seal is provided such that the smallest diameter portion 17 is closed.

The turn head 40 is turnable relative to the threadedly engaging member 31 in the embodiment. Accordingly, the turn head 40 idles relative to the threadedly engaging member 31 until further pressed to adhere closely to the open edge 19 of the smaller diameter portion 17 after abutment against the open edge. Consequently, the turn head 40 and the smallest diameter portion 17 can be prevented from wear due to sliding turn therebetween. Thus, the valve plug 30 can be improved in the reliability in its repeated use or operation.

Figure 5:
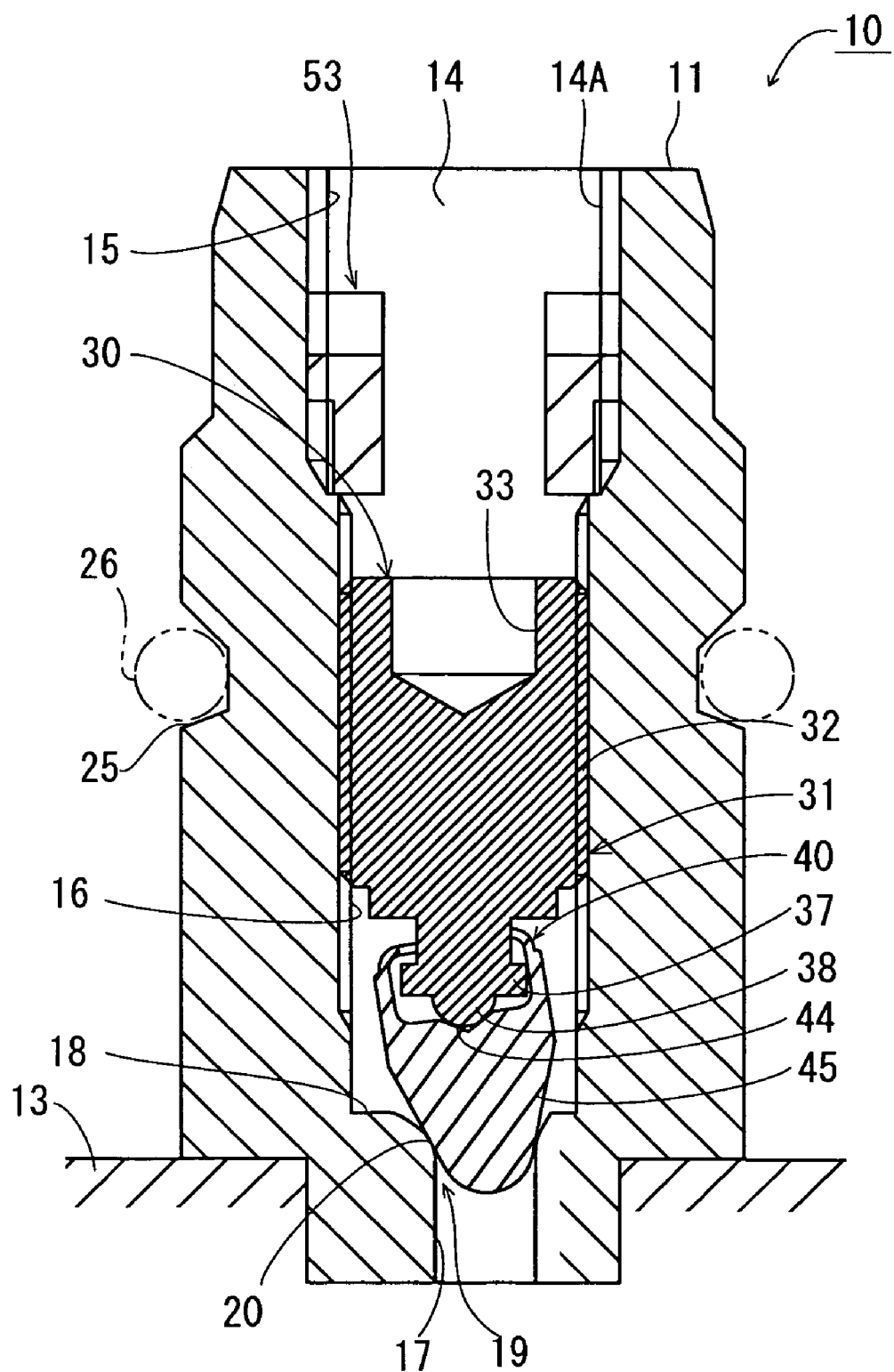
FIG. 5 is a side sectional view of the valve in a closed state with a turn head inclined.

Variations due to the forming may decenter the turn head 40 of the valve plug 30 and the smallest diameter portion 17 of the passage 14 relative to each other. More specifically, as typically shown in FIG. 5, the smallest diameter portion 17 may be decentered relative to the intermediate diameter portion 16 of the passage 14, for example. In this case, the distal end 45 of the turn head 40 reaches the smallest diameter portion 17, abutting a partial circumference of the open edge 19 of the smallest diameter portion 17. The turn head 40 is then inclined relative to the valve plug 30 so that the turn head 40 adheres closely to the overall circumference of the open edge 19 of the smallest diameter portion 17. Under this condition, the turn head 40 is further thrust by the threadedly engaging member 31 such that the smallest diameter portion 17 is closed as shown in FIG. 5. Since the distal end of the abutment boss 38 is received by the boss receiving portion 44, a fulcrum about which the turn head 40 is inclined is fixed, whereupon the turn head is stabilized.

In order that the compressed fluid in the refrigerant tube 13 may be returned into a predetermined tank, the valve 10 is opened with the refrigerant tube charged with the compressed fluid. The tool mounting cylinder 51 is fitted onto the stem 11, and the engaging portion 56 of the tool 54 extending through the tool mounting cylinder is fitted into the tool cavity 33 of the valve plug 30. The tool 54 is then turned so that the valve plug 30 is retreated, whereby the turn head 40 is departed from the smallest diameter portion 17. The compressed fluid discharged from the smallest diameter portion 17 passes through the communication passage 35 defined between the communication passage defining portion 34 and the inner circumferential face of the passage 14, flowing into the tool mounting cylinder 51. A gap between the tool mounting cylinder 51 and the stem 11 is closed by the O-ring 26, whereas a gap between the tool attachment hole 52 and the tool 54 is closed by the O-ring 55. Thus, the compressed fluid is prevented from leaking through these gaps. Accordingly, the compressed fluid having flowed into the tool mounting cylinder 51 is withdrawn through the supply and exhaust passage 58 into a predetermined tank. Furthermore, since the stopper ring 53 is in threaded engagement with the open end 14A side, the valve plug 30 is prevented from falling off from the passage 14 even when the threadedly engaging member 31 is excessively turned.

As obvious from the foregoing, the turn head 40 is turnably mounted on the distal end of the threadedly engaging member 31 of the valve plug 30. Accordingly, wear due to rotational sliding between the turn head 40 and the smallest diameter portion 17 can be reduced, whereupon the reliability of the valve plug 30 in its reiterative use can be increased. Furthermore, the communication passage 35 is formed at the location different from that of the tool hole 33 into which the tool 54 is fitted. Consequently, the charging with and releasing from the compressed fluid can be carried out while the valve plug 30 is being manipulated with the tool 54.

Figure 7:
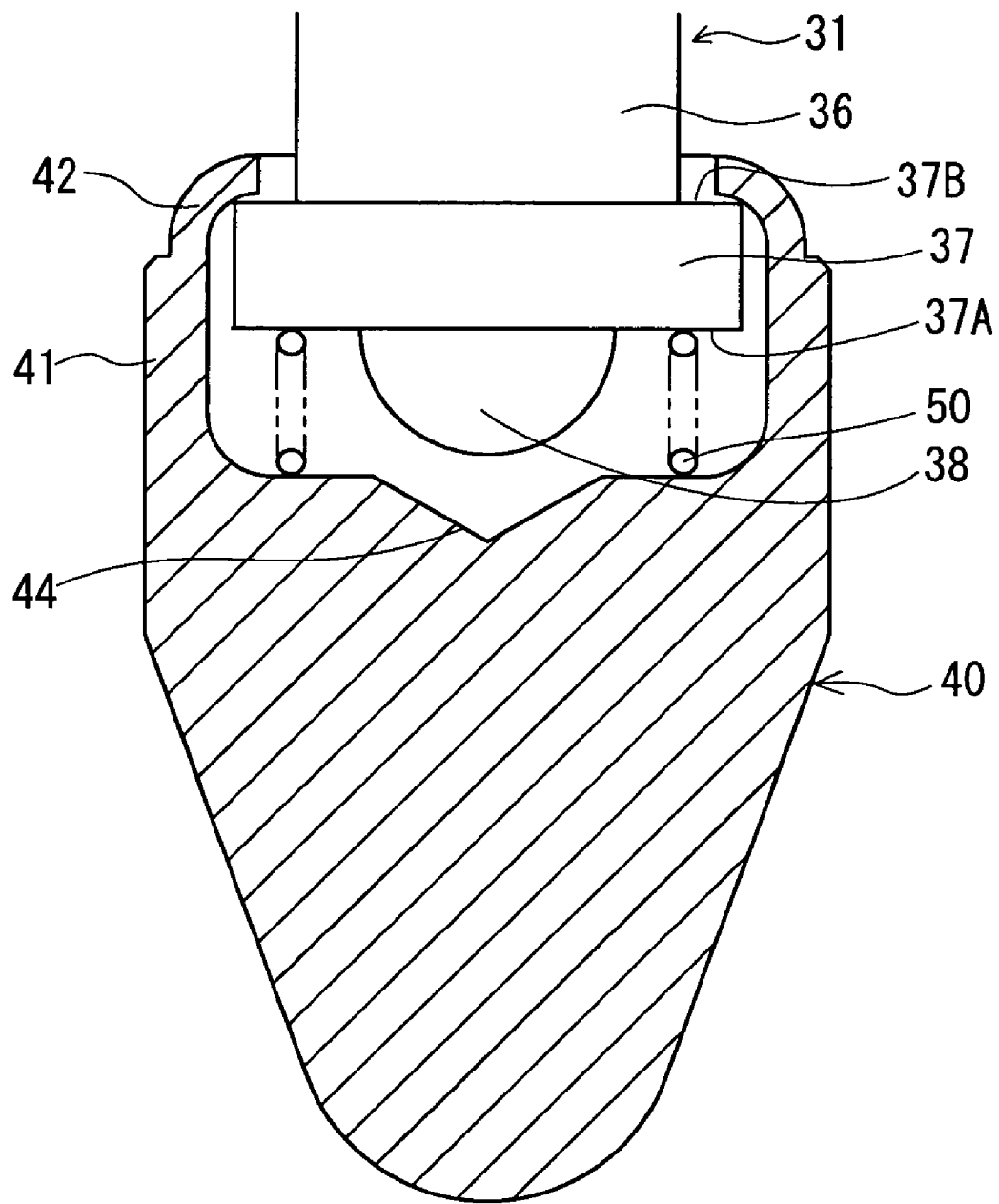
FIG. 7 is a partial sectional view of the valve plug in accordance with another embodiment of the invention.

FIG. 7 illustrates another embodiment of the invention. In the second embodiment, a compression coil spring 50 is provided between the end face 37A of the flange 37 and the inner face 43 of the cylindrical portion 41 of the turn head 40. The other construction of the second embodiment is identical with that of the first embodiment. Identical or similar parts in the second embodiment are labeled by the same reference symbols as those in the first embodiment and accordingly, the description of these parts will be eliminated.

The elastic member 50 holds the turn head 40 apart from the threadedly engaging member 31 when the turn head stays away from the smallest diameter portion 17 as shown in FIG. 7. When the threadedly engaging member 31 is threadedly engaged into the passage 14 so that the distal end 45 of the turn head 40 abuts the open edge 19 of the smallest diameter portion 17, the elastic member 50 is deformed so that the turn head 40 is inclined into a position corresponding to the smallest diameter portion. When the threadedly engaging member 31 is further threadedly thrust into the passage 14, the turn head 40 is directly pressed by the threadedly engaging member thereby to adhere close to the open edge 19 of the smallest diameter portion 17.

Thus, in the second embodiment, the elastic member 50 is provided between the turn head 40 and the threadedly engaging member 31. The turn head 40 is directly pressed by the threadedly engaging member 31 after having been inclined into the position corresponding to the smallest diameter portion 17. Consequently, variations in the shapes of the valve plug 30 and the passage 14 can be compensated for more reliably.

Figure 8:
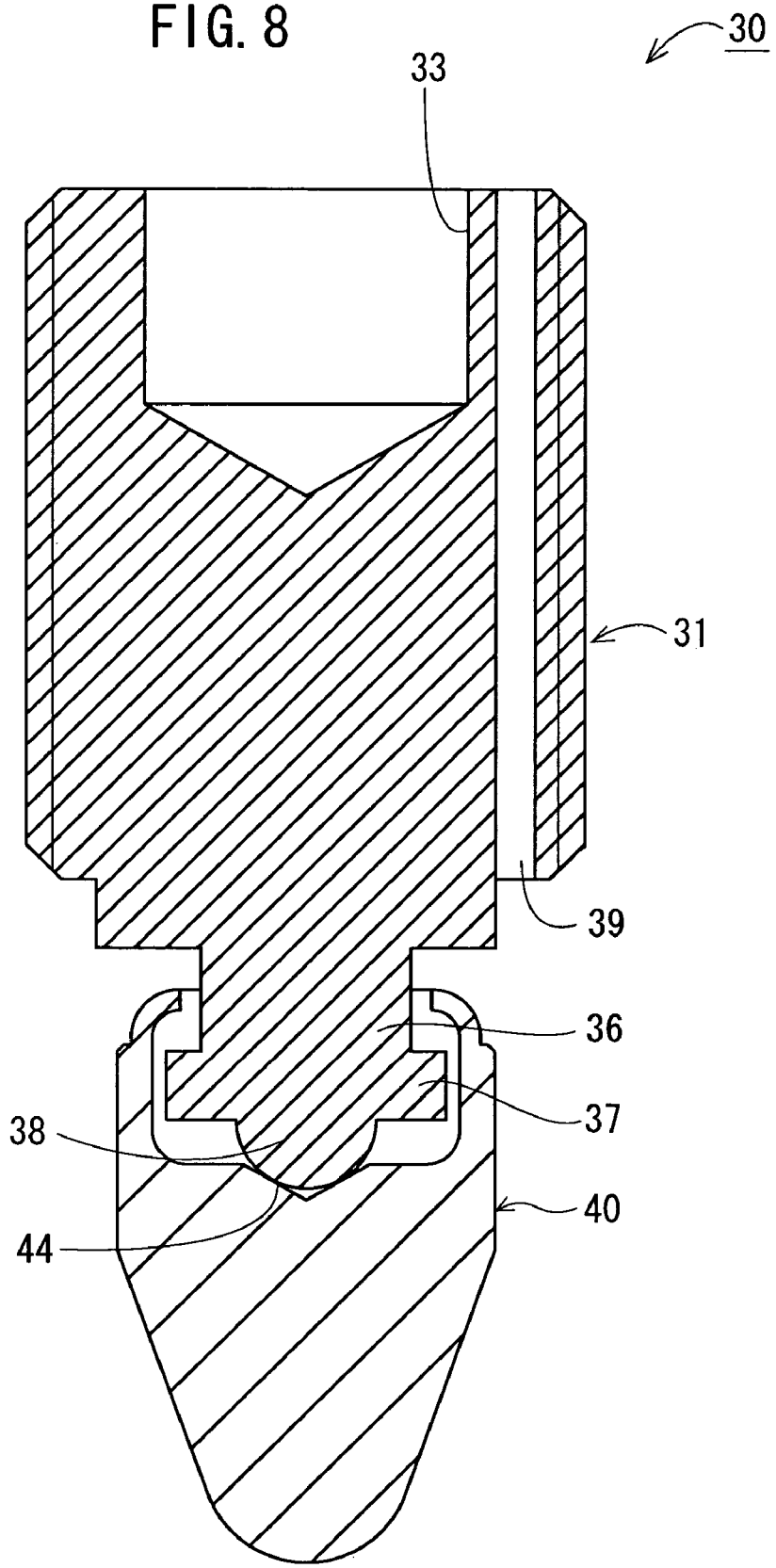
FIG. 8 is a side sectional view of a modified form of the valve plug.

Several modified forms of the first embodiment will be described. In the first embodiment, the communication passage defining portion 34 is formed on the outer face of the threadedly engaging member 31. The communication passage 35 is defined between the communication passage defining portion 34 and the inner face of the passage 14. However, as shown in FIG. 8, a communication passage 39 may be formed so as to axially extend through the threadedly engaging member 31 at the end face of the member 31 opposed to the turn head 40 and further so as to bypass the tool hole 33. The communication passage 39 may communicate with spaces defined at both sides of the threadedly engaging member 31.

The invention is applied to the valve 10 is connected to the refrigerant tube 13 of the car air conditioner in the first embodiment. However, the valve of the invention should not be limited to the use with the refrigerant tube.

Figure 9:
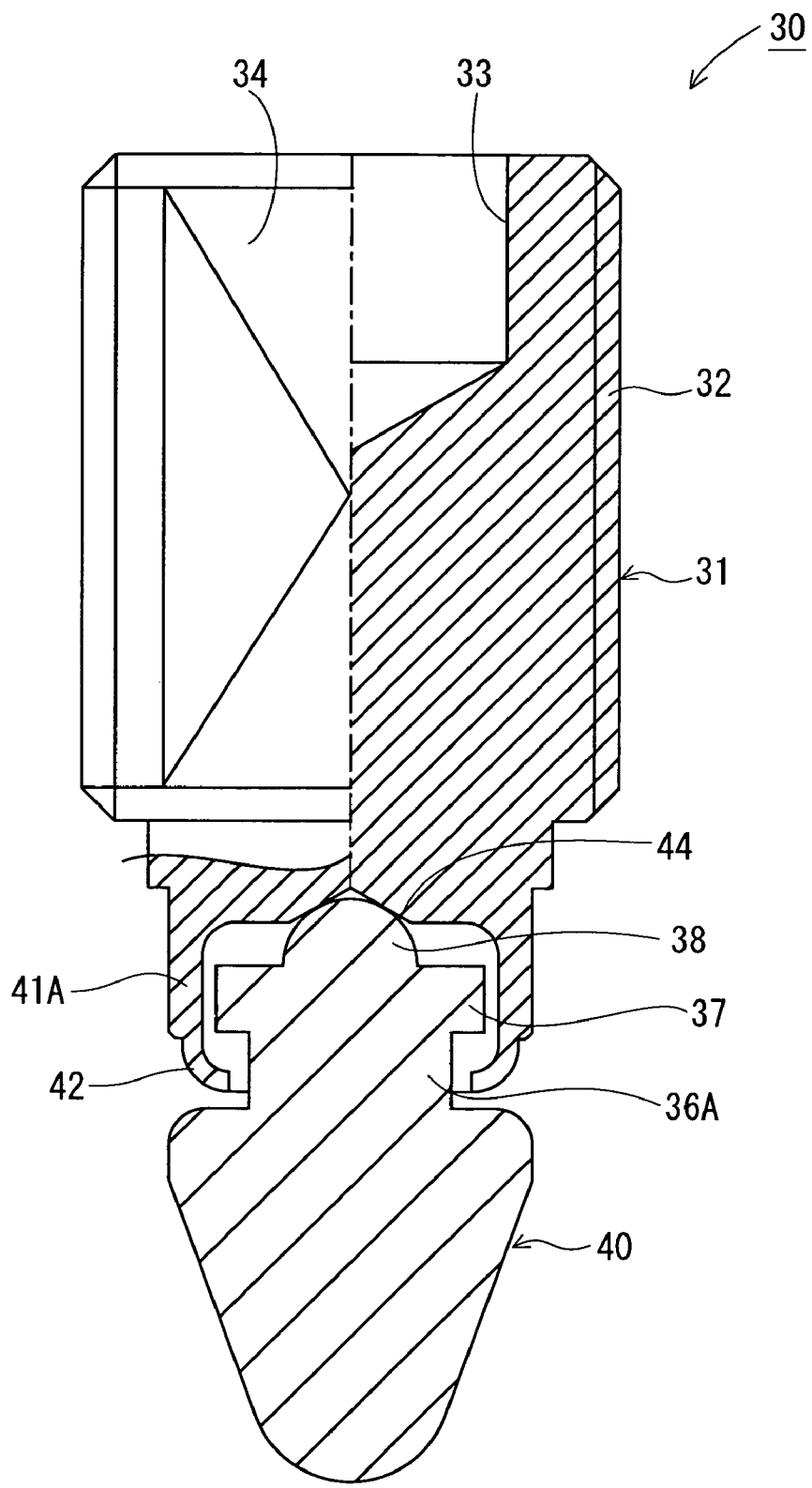
FIG. 9 is a partially sectional view of the valve plug of the modified form.

In the first embodiment, the support shaft 36 protrudes from the threadedly engaging member 31 side and the cylindrical portion 41 is provided on the turn head 40 side. However, on the contrary, the cylindrical member may 41A be provided on the threadedly engaging member 31 and the support shaft 36A may be provided on the turn head 40 as shown in FIG. 9.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A valve plug threadedly engaged thereby to be inserted from an open end of a passage for charging with and/or releasing from a compressed fluid toward an inner part of the passage, thereby closing a smaller diameter portion, the valve plug comprising:

a threadedly engaging member threadedly engaging a portion of the passage located nearer to the open end side than the smaller diameter portion;

a turn head turnably connected to an end of the threadedly engaging member and having a distal end inserted into the smaller diameter portion so as to adhere closely to an open edge of the smaller diameter portion;

a support shaft protruding from either one of the threadedly engaging member and the turn head toward the other, the support shaft having a distal end formed with a flange and a cylindrical portion formed so as to protrude from said other of the threadedly engaging member and the turn head toward said one of the threadedly engaging member and the turn head, wherein the flange is accommodated in the cylindrical portion and the cylindrical portion has a distal end inwardly bent so that the turn head is turnably connected to said one end of the threadedly engaging member; and wherein the cylindrical portion has an inner face and the flange has an end face, said inner face and said end face being opposed to each other, the valve plug further comprising an elastically compressible member provided between the inner face of the cylindrical portion and the end face of the flange.

2. A valve plug according to claim 1, wherein the threadedly engaging member has an end face located opposite the turn head and formed with a tool cavity used for threaded engagement of the threadedly engaging member, and the threadedly engaging member has an outer peripheral face including a communication passage defining portion defining a communication passage in association with an inner circumferential face of the passage, the compressed fluid flowing through the communication passage.

3. A valve plug threadedly engaged thereby to be inserted from an open end of a passage for charging with and/or releasing from a compressed fluid toward an inner part of the passage, thereby closing a smaller diameter portion, the valve plug comprising:

a threadedly engaging member threadedly engaging a portion of the passage located nearer to the open end side than the smaller diameter portion;

a turn head turnably connected to an end of the threadedly engaging member and having a distal end inserted into the smaller diameter portion so as to adhere closely to an open edge of the smaller diameter portion;

a support shaft protruding from either one of the threadedly engaging member and the turn head toward the other, the support shaft having a distal end formed with a flange and a cylindrical portion formed so as to protrude from said other of the threadedly engaging member and the turn head toward said one of the threadedly engaging member and the turn head, wherein the flange is accommodated in the cylindrical portion and the cylindrical portion has a distal end inwardly bent so that the turn head is turnably connected to said one end of the threadedly engaging member, the cylindrical portion having an inner face and the flange having an end face, said inner face and said end face being opposed to each other, and either one of the inner face of the cylindrical portion and the end face of the flange includes a semispherical abutment boss protruding therefrom; and an elastically compressible member provided between the inner face of the cylindrical portion and the end face of the flange.

4. A valve plug according to claim 3, wherein the threadedly engaging member has an end face located opposite the turn head and formed with a tool cavity used for threaded engagement of the threadedly engaging member, and the threadedly engaging member has an outer peripheral face including a communication passage defining portion defining a communication passage in association with an inner circumferential face of the passage, the compressed fluid flowing through the communication passage.

5. A valve plug threadedly engaged thereby to be inserted from an open end of a passage for charging with and/or releasing from a compressed fluid toward an inner part of the passage, thereby closing a smaller diameter portion, the valve plug comprising:

a threadedly engaging member threadedly engaging a portion of the passage located nearer to the open end side than the smaller diameter portion;

a turn head turnably connected to an end of the threadedly engaging member and having a distal end inserted into the smaller diameter portion so as to adhere closely to an open edge of the smaller diameter portion;

a support shaft protruding from either one of the threadedly engaging member and the turn head toward the other, the support shaft having a distal end formed with a flange and a cylindrical portion formed so as to protrude from said other of the threadedly engaging member and the turn head toward said one of the threadedly engaging member and the turn head, wherein the flange is accommodated in the cylindrical portion and the cylindrical portion has a distal end inwardly bent so that the turn head is turnably connected to said one end of the threadedly engaging member, the cylindrical portion having an inner face and the flange having an end face, said inner face and said end face being opposed to each other, and either one of the inner face of the cylindrical portion and the end face of the flange includes a semispherical abutment boss protruding therefrom;

a face the abutment boss abuts, wherein said face is formed with a conical boss receiving portion receiving a distal end of the abutment boss; and an elastically compressible member provided between the inner face of the cylindrical portion and the end face of the flange.

6. A valve plug according to claim 5, wherein the threadedly engaging member has an end face located opposite the turn head and formed with a tool cavity used for threaded engagement of the threadedly engaging member, and the threadedly engaging member has an outer peripheral face including a communication passage defining portion defining a communication passage in association with an inner circumferential face of the passage, the compressed fluid flowing through the communication passage.

7. A valve plug threadedly engaged thereby to be inserted from an open end of a passage for charging with and/or releasing from a compressed fluid toward an inner part of the passage, thereby closing a smaller diameter portion, the valve plug comprising:

a threadedly engaging member threadedly engaging a portion of the passage located nearer to the open end side than the smaller diameter portion; and a turn head turnably connected to an end of the threadedly engaging member and having a distal end inserted into the smaller diameter portion so as to adhere closely to an open edge of the smaller diameter portion, wherein the threadedly engaging member has an end face located opposite the turn head and formed with a tool cavity used for threaded engagement of the threadedly engaging member, and the threadedly engaging member has an outer peripheral face including a communication passage defining portion defining a communication passage in association with an inner circumferential face of the passage, the compressed fluid flowing through the communication passage.

8. A valve plug according to claim 7, wherein the threadedly engaging member has an end face located opposite the turn head and formed with a tool cavity used for threaded engagement of the threadedly engaging member, and the threadedly engaging member has a communication passage formed in a part of the end face thereof, the communication passage avoiding the tool cavity and axially extending through the threadedly engaging member.

9. A valve plug threadedly engaged thereby to be inserted from an open end of a passage for charging with and/or releasing from a compressed fluid toward an inner part of the passage, thereby closing a smaller diameter portion, the valve plug comprising:
 a threadedly engaging member threadedly engaging a portion of the passage located nearer to the open end side than the smaller diameter portion;
 a turn head turnably connected to an end of the threadedly engaging member and having a distal end inserted into the smaller diameter portion so as to adhere closely to an open edge of the smaller diameter portion; and
 a support shaft protruding from either one of the threadedly engaging member and the turn head toward the other, the support shaft having a distal end formed with a flange and a cylindrical portion formed so as to protrude from said other of the threadedly engaging member and the turn head toward said one of the threadedly engaging member and the turn head, wherein the flange is accommodated in the cylindrical portion and the cylindrical portion has a distal end inwardly bent so that the turn head is turnably connected to said one end of the threadedly engaging member, wherein the threadedly engaging member has an end face located opposite the turn head and formed with a tool cavity used for threaded engagement of the threadedly engaging member, and the threadedly engaging member has an outer peripheral face including a communication passage defining portion defining a communication passage in association with an inner circumferential face of the passage, the compressed fluid flowing through the communication passage.

10. A valve plug threadedly engaged thereby to be inserted from an open end of a passage for charging with and/or releasing from a compressed fluid toward an inner part of the passage, thereby closing a smaller diameter portion, the valve plug comprising:
 a threadedly engaging member threadedly engaging a portion of the passage located nearer to the open end side than the smaller diameter portion;
 a turn head turnably connected to an end of the threadedly engaging member and having a distal end inserted into the smaller diameter portion so as to adhere closely to an open edge of the smaller diameter portion; and
 a support shaft protruding from either one of the threadedly engaging member and the turn head toward the other, the support shaft having a distal end formed with a flange and a cylindrical portion formed so as to protrude from said other of the threadedly engaging member and the turn head toward said one of the threadedly engaging member and the turn head, wherein the flange is accommodated in the cylindrical portion and the cylindrical portion has a distal end inwardly bent so that the turn head is turnably connected to said one end of the threadedly engaging member, the cylindrical portion having an inner face and the flange having an end face, said inner face and said end face being opposed to each other, and either one of the inner face of the cylindrical portion and the end face of the flange includes a semispherical abutment boss protruding therefrom, wherein the threadedly engaging member has an end face located opposite the turn head and formed with a tool cavity used for threaded engagement of the threadedly engaging member, and the threadedly engaging member has an outer peripheral face including a communication passage defining portion defining a communication passage in association with an inner circumferential face of the passage, the compressed fluid flowing through the communication passage.

11. A valve plug threadedly engaged thereby to be inserted from an open end of a passage for charging with and/or releasing from a compressed fluid toward an inner part of the passage, thereby closing a smaller diameter portion, the valve plug comprising:
 a threadedly engaging member threadedly engaging a portion of the passage located nearer to the open end side than the smaller diameter portion;
 a turn head turnably connected to an end of the threadedly engaging member and having a distal end inserted into the smaller diameter portion so as to adhere closely to an open edge of the smaller diameter portion;
 a support shaft protruding from either one of the threadedly engaging member and the turn head toward the other, the support shaft having a distal end formed with a flange and a cylindrical portion formed so as to protrude from said other of the threadedly engaging member and the turn head toward said one of the threadedly engaging member and the turn head, wherein the flange is accommodated in the cylindrical portion and the cylindrical portion has a distal end inwardly bent so that the turn head is turnably connected to said one end of the threadedly engaging member, the cylindrical portion having an inner face and the flange having an end face, said inner face and said end face being opposed to each other, and either one of the inner face of the cylindrical portion and the end face of the flange includes a semispherical abutment boss protruding therefrom; and a face the abutment boss abuts, wherein said face is formed with a conical boss receiving portion receiving a distal end of the abutment boss, wherein the threadedly engaging member has an end face located opposite the turn head and formed with a tool cavity used for threaded engagement of the threadedly engaging member, and the threadedly engaging member has an outer peripheral face including a communication passage defining portion defining a communication passage in association with an inner circumferential face of the passage, the compressed fluid flowing through the communication passage.

12. A valve comprising:
 a stem having a passage defined therein for charging and/or releasing from a compressed fluid;
 a valve plug threadedly engaged thereby to be inserted from an open end of a passage toward an inner part of the passage, thereby closing a smaller diameter portion formed by narrowing the inner part of the passage, the valve plug comprising;

a threadedly engaging member provided in the valve plug for threadedly engaging a portion of the passage located nearer to the open end side than the smaller diameter portion;

a turn head turnably connected to an end of the threadedly engaging member and having a distal end which is tapered and inserted into the smaller diameter portion so as to adhere closely to an open edge of the smaller diameter portion; and a support shaft protruding from either one of the threadedly engaging member and the turn head toward the other, the support shaft having a distal end formed with a flange and a cylindrical portion formed so as to protrude from said other of the threadedly engaging member and the turn head toward said one of the threadedly engaging member and the turn head, wherein the flange is accommodated in the cylindrical portion and the cylindrical portion has a distal end inwardly bent so that the turn head is turnably connected to said one end of the threadedly engaging member, wherein the cylindrical portion has an inner face and the flange has an end face, said inner face and said end face being opposed to each other, the valve plug further comprising an elastically compressible member provided between the inner face of the cylindrical portion and the end face of the flange.

13. A valve comprising:

a stem having a passage defined therein for charging and/or releasing from a compressed fluid;

a valve plug threadedly engaged thereby to be inserted from an open end of a passage toward an inner part of the passage, thereby closing a smaller diameter portion formed by narrowing the inner part of the passage, the valve plug comprising:

a threadedly engaging member provided in the valve plug for threadedly engaging a portion of the passage located nearer to the open end side than the smaller diameter portion; and a turn head turnably connected to an end of the threadedly engaging member and having a distal end which is tapered and inserted into the smaller diameter portion so as to adhere closely to an open edge of the smaller diameter portion, wherein the threadedly engaging member has an end face located opposite the turn head and formed with a tool cavity used for threaded engagement of the threadedly engaging member, and the threadedly engaging member has an outer peripheral face includes a communication passage defining portion defining a communication passage in association with an inner circumferential face of the passage, the compressed fluid flowing through the communication passage.

14. A valve according to claim 13, further comprising:

a tool attaching cylinder detachably fitted with an outer periphery of the stem and having a bottom formed with a tool attaching through hole and an end;

a first seal closing a gap between the tool attaching cylinder and the stem;

a tool applied to the valve so as to extend through the tool attaching hole of the bottom of the tool attaching cylinder, the tool having one of two ends provided with an engagement portion the threadedly engaging member engages and the other end provided with a manipulating portion; and a second seal closing a gap between the tool attaching hole and the tool extending through the tool attaching hole; and a supply and exhaust passage provided between an interior and exterior of the tool attaching cylinder for fluid communication therebetween.

15. A valve comprising:

a stem having a passage defined therein for charging and/or releasing from a compressed fluid;

a valve plug threadedly engaged thereby to be inserted from an open end of a passage toward an inner part of the passage, thereby closing a smaller diameter portion formed by narrowing the inner part of the passage, the valve plug comprising:

a threadedly engaging member provided in the valve plug for threadedly engaging a portion of the passage located nearer to the open end side than the smaller diameter portion; and a turn head turnably connected to an end of the threadedly engaging member and having a distal end which is tapered and inserted into the smaller diameter portion so as to adhere closely to an open edge of the smaller diameter portion, wherein the threadedly engaging member has an end face located opposite the turn head and formed with a tool cavity used for threaded engagement of the threadedly engaging member, and the threadedly engaging member has a communication passage formed in a part of the end face thereof, the communication passage bypassing the tool cavity and axially extending through the threadedly engaging member.

16. A valve according to claim 15, further comprising:

a tool attaching cylinder detachably fitted with an outer periphery of the stem and having a bottom formed with a tool attaching through hole and an end;

a first seal closing a gap between the tool attaching cylinder and the stem;

a tool applied to the valve so as to extend through the tool attaching hole of the bottom of the tool attaching cylinder, the tool having one of two ends provided with an engagement portion the threadedly engaging member engages and the other end provided with a manipulating portion; and a second seal closing a gap between the tool attaching hole and the tool extending through the tool attaching hole; and a supply and exhaust passage provided between an interior and exterior of the tool attaching cylinder for fluid communication therebetween.

17. A valve comprising: a stem having a passage defined therein for charging and/or releasing from a compressed fluid;

a tool attaching cylinder detachably fitted with an outer periphery of the stem and having a bottom formed with a tool attaching through hole and an end;

a first seal closing a gap between the tool attaching cylinder and the stem;

a tool applied to the valve so as to extend through the tool attaching hole of the bottom of the tool attaching cylinder, the tool having one of two ends provided with an engagement portion the threadedly engaging member engages and the other end provided with a manipulating portion;

a second seal closing a gap between the tool attaching hole and the tool extending through the tool attaching hole;
a supply and exhaust passage provided between an interior and exterior of the tool attaching cylinder for fluid communication therebetween;
a valve plug threadedly engaged thereby to be inserted from an open end of a passage toward an inner part of the passage, thereby closing a smaller diameter portion formed by narrowing the inner part of the passage, the valve plug comprising:

a threadedly engaging member provided in the valve plug for threadedly engaging a portion of the passage located nearer to the open end side than the smaller diameter portion; and
a turn head turnably connected to an end of the threadedly engaging member and having a distal end which is tapered and inserted into the smaller diameter portion so as to adhere closely to an open edge of the smaller diameter portion.

* * * * *